(12) United States Patent
Reinmuth et al.

(10) Patent No.: US 12,149,903 B2
(45) Date of Patent: Nov. 19, 2024

(54) DEVICE FOR DETECTING SOUND IN THE SURROUNDINGS OF AN AUTOMOBILE

(71) Applicant: Robert Bosch GmbH, Stuttgart (DE)

(72) Inventors: Jochen Reinmuth, Reutlingen (DE); Amin Jemili, Kusterdingen (DE); Georg Bischopink, Pliezhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/750,539

(22) Filed: May 23, 2022

(65) Prior Publication Data
US 2022/0386028 A1    Dec. 1, 2022

(30) Foreign Application Priority Data

May 28, 2021 (DE) .................. 10 2021 205 466.8

(51) Int. Cl.
*H04R 5/04* (2006.01)
*B60R 11/02* (2006.01)
*H04R 3/00* (2006.01)

(52) U.S. Cl.
CPC ............ *H04R 5/04* (2013.01); *B60R 11/0247* (2013.01); *H04R 3/005* (2013.01); *H04R 2499/13* (2013.01)

(58) Field of Classification Search
None
See application file for complete search history.

(56) References Cited

U.S. PATENT DOCUMENTS

| 7,020,288 B1* | 3/2006 | Ohashi ............. G10K 11/17854 |
| | | 381/71.4 |
| 2015/0036832 A1 | 2/2015 | Usher et al. |
| 2018/0211648 A1 | 7/2018 | Nagai |
| 2020/0154220 A1* | 5/2020 | Wacquant .............. H04R 27/00 |

FOREIGN PATENT DOCUMENTS

| DE | 102013226040 A1 | 6/2015 |
| DE | 102018216676 B3 | 12/2019 |
| DE | 102018216688 A1 | 4/2020 |

* cited by examiner

*Primary Examiner* — Paul W Huber
(74) *Attorney, Agent, or Firm* — NORTON ROSE FULBRIGHT US LLP; Gerard A. Messina

(57) ABSTRACT

A device for detecting sound in the surroundings of an automobile, including a first structure-borne noise sensor, which is acoustically coupled to a first oscillating body at an outside of the automobile and provides a first audio signal, including a second audio signal, which represents sound from an interior of the automobile, and including a processing unit, which is configured to subtract at least the second audio signal from the first audio signal.

7 Claims, 1 Drawing Sheet

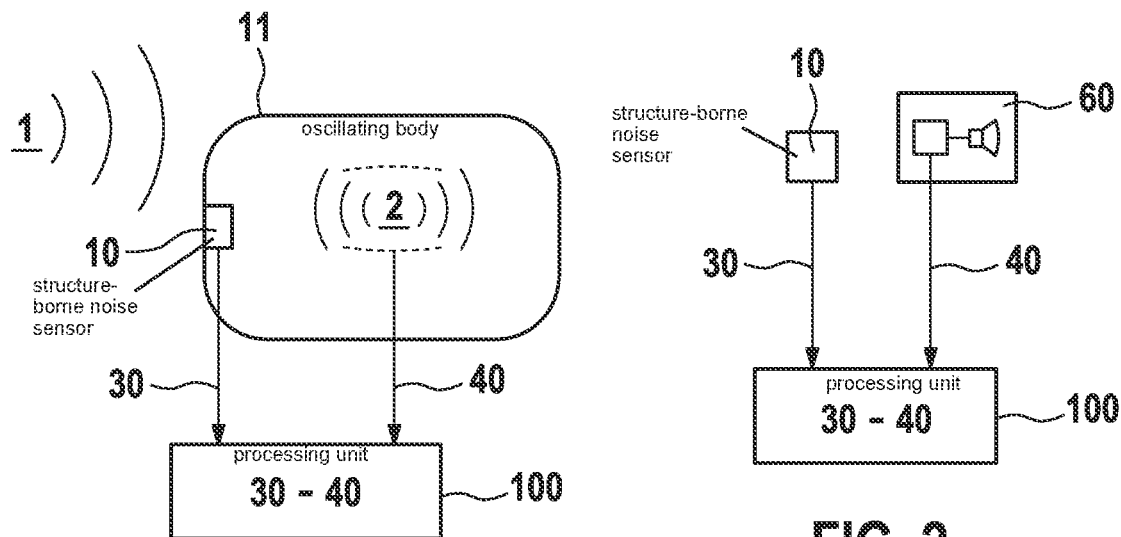
FIG. 1
FIG. 2
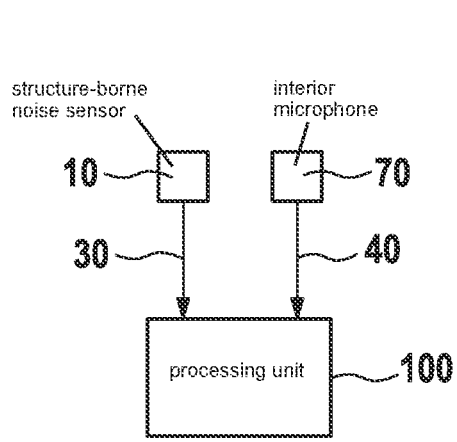
FIG. 3
FIG. 5
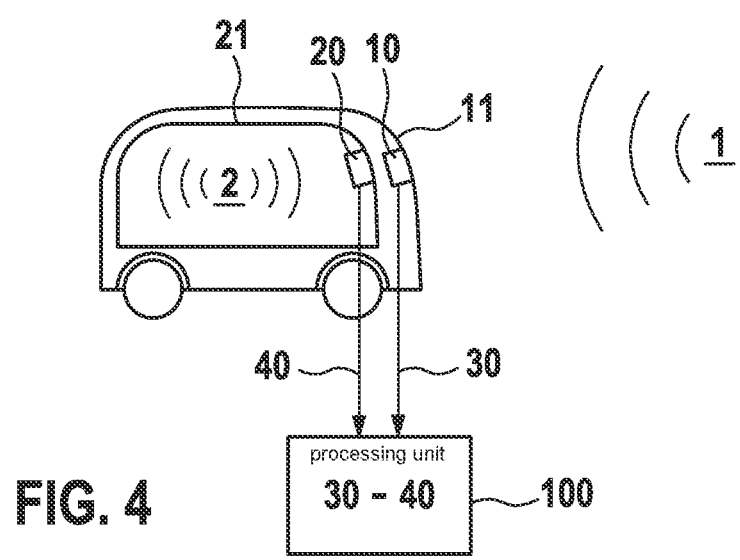
FIG. 4

DEVICE FOR DETECTING SOUND IN THE SURROUNDINGS OF AN AUTOMOBILE

CROSS REFERENCE

The present application claims the benefit under 35 U.S.C. § 119 of German Patent Application No. DE 10 2021 205 466.8 filed on May 28, 2021, which is expressly incorporated herein by reference in its entirety.

FIELD

The present invention relates to a device for detecting sound in the surroundings of an automobile.

BACKGROUND INFORMATION

Automobiles are increasingly better insulated in the interior against sound from the outside and against sound from the engine compartment to increase the comfort for the occupants and the ability to concentrate for the driver. It is disadvantageous that acoustic warning noises from the outside, such as sirens, are increasingly difficult to perceive in the interior.

Systems which recognize these noises and give the driver a warning message in this regard are available in the related art. Such systems will become more and more important in future with autonomously driving automobiles, because autonomous vehicles automatically recognize a siren and also other sound signals and as much as possible are also able to determine the direction from which the noise comes.

To enable such automated recognition, microphones are necessary which may pick up external noises as well and as reliably as possible. It is problematic that classic microphones are very sensitive to dust, moisture, and overload and are therefore destroyed very rapidly in the outside area of the automobile or their sensitivity decreases quickly and in an undefined manner. The inside area of the automobile, in contrast, is protected well against moisture and dust, but it is also shielded well against sound from the outside, due to which a sound signal from the outside is difficult to detect in the interior.

SUMMARY

An object of the present invention is to provide a microphone arrangement using which external sound may be picked up at the vehicle sensitively, with little interference noise, and reliably. Furthermore, an object of the present invention is to provide a method using which the most noise-free signal possible of the external sound may be generated.

In accordance with an example embodiment of the present invention, instead of a classic microphone for detecting the external sound, a structure-borne noise sensor is used. Structure-borne noise sensors are significantly more robust with respect to environmental influences.

The structure-borne noise sensor is advantageously attached on the inside of the automobile at a first point which may be excited to oscillation via the external sound. This may be, for example, the inside of a side window of the automobile or the inside of another paneling component of the automobile oriented outward. By attaching it to the inside, the structure-borne noise sensor is additionally protected by the bodyshell of the automobile from all environmental influences, except for shocks to the bodyshell.

In one advantageous example embodiment of the present invention, the structure-borne noise is additionally measured at a second position which may be excited to oscillation via the external sound with more difficulty or not at all. The structure-borne noise is preferably again measured on the inside or in the interior of the automobile at a point located spatially close to the first position.

Additionally or alternatively, the sound in the interior of the automobile (internal sound) is picked up via a classic microphone or the signal of the audio system of the automobile is also used.

The signal of the second structure-borne noise sensor or also a signal component of the internal sound is subtracted from the signal of the first structure-borne noise sensor. A high-quality signal of the external sound is thus obtained. Using this arrangement and this method, sound may be detected well in the surroundings of the automobile, while interference signals of the automobile may be suppressed very well.

The arrangement permits a very robust structure. In accordance with an example embodiment of the present invention, a MEMS-based acceleration sensor is preferably used to measure the structure-borne noise. This is a closed system which picks up the acceleration via its housing and converts it into an electrical signal. It is therefore very well protected against dirt and moisture. It is also very well protected against an overload. In contrast, a classic microphone always requires a direct media access for the sound and is therefore difficult to protect. The structure-borne noise sensor is advantageously attached to the inside of the paneling of the automobile and is therefore automatically protected very well against direct influences from the outside.

The arrangement permits a very good signal quality. The external sound is coupled directly to the paneling of the automobile and therefore may also be detected very well at the paneling. A classic microphone would always be protected with one or multiple diaphragm(s) in this application, via which the signal is transferred into a second space and is only detected there. This results in significant attenuation of the signal. The natural vibration of the automobile and the internal sound may be suppressed very well in this arrangement. Using a classic microphone, it may not be possible to distinguish the sound which comes from the outside from the sound which arises due to the vibration of the automobile and the engine.

BRIEF DESCRIPTION OF THE DRAWINGS

FIG. 1 schematically shows a device according to the present invention for detecting sound in the surroundings of an automobile in a first exemplary embodiment.

FIG. 2 schematically shows a device according to the present invention for detecting sound in the surroundings of an automobile in a second exemplary embodiment.

FIG. 3 schematically shows a device according to the present invention for detecting sound in the surroundings of an automobile in a third exemplary embodiment.

FIG. 4 schematically shows a device according to the present invention for detecting sound in the surroundings of an automobile in a fourth exemplary embodiment.

FIG. 5 schematically shows a device according to the present invention for detecting sound in the surroundings of an automobile in a fifth exemplary embodiment.

DETAILED DESCRIPTION OF EXAMPLE EMBODIMENTS

FIG. 1 schematically shows a device according to the present invention for detecting sound in the surroundings of an automobile in a first exemplary embodiment.

Sound 1 in the surroundings of an automobile is incident on a first oscillating body 11 on an outside of the automobile. A first structure-borne noise sensor 10 is acoustically coupled to the first oscillating body, in the best way in that the sensor is fastened thereon. The first structure-borne noise sensor provides a first audio signal 30. In addition, a second audio signal 40 is provided, which represents further sound 2 from an interior of the automobile and may originate from greatly varying sources. The audio signals are supplied to a processing unit 100, which is configured to subtract at least the second audio signal from the first audio signal. The processing unit is, for example, a sound processor, in particular a DSP.

FIG. 2 schematically shows a device according to the present invention for detecting sound in the surroundings of an automobile in a second exemplary embodiment.

Second audio signal 40 is provided in this example by an active sound source 60, in particular an audio system, in the automobile. The second audio signal is represented in electronic form—analog or digital—and corresponds to the acoustic spectrum which the active sound source emits simultaneously, for example, with the aid of a loudspeaker, into the interior of the automobile.

FIG. 3 schematically shows a device according to the present invention for detecting sound in the surroundings of an automobile in a third exemplary embodiment.

Second audio signal 40 is provided in this example by a further noise sensor, an interior microphone 70 here.

FIG. 4 schematically shows a device according to the present invention for detecting sound in the surroundings of an automobile in a fourth exemplary embodiment.

Second audio signal 40 is provided in this example by a further noise sensor, a second structure-borne noise sensor 20 here. The second structure-borne noise sensor is acoustically coupled to a second oscillating body 21 on an inside 22 of the automobile, for example, an internal paneling. This is best effectuated in that the second structure-borne noise sensor is fastened at the internal paneling. First structure-borne noise sensor 10 is situated at an inside of the automobile, for example, at an inside of an automobile window or at the inside of an external paneling component of the automobile. Second structure-borne noise sensor 20 is situated in the spatial vicinity of first structure-borne noise sensor 10. First oscillating body 11 and the second oscillating body are each acoustically coupled differently to external sound 1 and interior sound 2, so that first structure-borne noise sensor 10 is at least partially acoustically decoupled from second structure-borne noise sensor 20.

FIG. 5 schematically shows a device according to the present invention for detecting sound in the surroundings of an automobile in a fifth exemplary embodiment.

Processing unit 100 is also configured in this example to subtract one or multiple third audio signal(s) 50 from first audio signal 30, which are provided in particular by an active sound source 60 in the automobile or an interior microphone 70 or other possible audio sources.

Micromechanical acceleration sensors are preferably used as the first and second structure-borne noise sensors.

In one advantageous arrangement, at least one first acceleration sensor is preferably fixedly anchored on the side window or the rear window or the sunroof in an inner area of the window and at least one second acceleration sensor is fixedly anchored in the edge area of the window. The signal or a part of the signal of the second acceleration sensor is subtracted from the signal of the first acceleration sensor. Furthermore, the signal of an internal microphone or the audio system of the automobile may additionally also be subtracted from the signal.

In one particularly cost-effective variant, only a first acceleration sensor is fixedly anchored on a window and only the signal of an internal microphone or the audio system of the automobile is subtracted from the signal of the first acceleration sensor.

In a further advantageous arrangement, the first acceleration sensor is installed on the inside of the sheet-metal paneling of the automobile, at a point which may be excited to oscillation by external sound. Metal transfers sound oscillations very well, similarly to glass. The paneling may be stiffened or not stiffened in such a way that the section at which the first acceleration sensor is fastened reacts particularly well to the external sound. A second acceleration sensor is situated on a stiffened area, preferably in the structural vicinity.

It is advantageous that the acceleration sensor is not visible to the customers and the stiffening may also take place on the inside of the paneling, is therefore very well adaptable, and is additionally also not visible to the customer.

Furthermore, it is advantageous that the sensor and the paneling may be shielded toward the interior, in particular may be provided with a sound protection, so that sound of the occupants or the audio system does not interfere with the external signal.

It is particularly advantageous if the glass pane or the paneling element on which the oscillation is measured is connected to the automobile flexibly or partially flexibly, for example, using a seal. Fewer natural vibrations may thus be transferred from the automobile to the element and/or the vibrations may be damped.

It is particularly advantageous to use two acceleration sensors having a characteristic (transfer function) and bandwidth which are similar or as equal as possible for the difference formation of the signal, to thus enable the best possible subtraction with little error. It is reasonable to use somewhat wider band acceleration sensors and then also filter the difference signal through a somewhat narrower bandpass to obtain the best possible signal.

Acceleration sensors having a bandwidth of 50 Hz to 600 Hz, in particular having a bandwidth of 360 Hz to 700 Hz, are particularly advantageous.

Furthermore, it may be advantageous to control the intensities of the two signals during the subtraction dynamically via a floating average in such a way that the difference signal is minimized in order to compensate for sensitivity variations of the two sensors, which occur, for example, due to different temperature behavior.

Furthermore, it is advantageous to use two or more of the sound detection arrangements provided here. The sound direction may then also be determined via the signal intensity or the phase information of the individual signals.

The application is not restricted to the evaluation of the difference signal of the two acceleration sensors. The two signals may also be used to determine further parameters. The structure-borne noise of the second sensor may be used, for example, to derive the road condition. If the surface on which the first sensor is attached is oriented upward or forward, rain may also be detected, for example, via an analysis of the signal. Many further applications are possible.

Subtraction or difference formation of a second signal from a first signal is understood here not only as actual subtraction in the narrower sense, it may also very generally relate to a change of a first signal on the basis of a second signal. For example, if a second signal having a very large amplitude is present at a defined frequency it may be advantageous to filter this frequency or this frequency band deliberately and completely out of the first signal.

LIST OF REFERENCE NUMERALS 1 sound in the surroundings of the automobile
2 further sound from the interior of the automobile
10 first structure-borne noise sensor
11 first oscillating body
20 second structure-borne noise sensor
21 second oscillating body
30 first audio signal
40 second audio signal
50 third audio signal
60 active sound source
70 interior microphone
100 processing unit

What is claimed is:

1. A device for detecting sound in surroundings of an automobile, the device comprising:
   a first structure-borne noise sensor which is acoustically coupled to a first oscillating body at an outside of the automobile and provides a first audio signal;
   a second audio signal which represents further sound from an interior of the automobile; and
   a processing unit configured to subtract at least the second audio signal from the first audio signal,
   a further noise sensor which is configured to detect the further sound from an interior of the automobile and to provide the second audio signal,
   wherein the further noise sensor is a second structure-borne noise sensor, which is acoustically coupled to a second oscillating body at an inside of the automobile,
   wherein the first oscillating body and the second oscillating body are acoustically coupled differently such that the first structure-borne noise sensor is at least partially acoustically decoupled from the second structure-borne noise sensor,
   wherein the processing unit is configured to subtract a third audio signal from the first audio signal.

2. The device as recited in claim 1, wherein the second audio signal is provided by an active sound source including an audio system, in the automobile.

3. The device as recited in claim 1, wherein the second structure-borne noise sensor includes an interior microphone.

4. The device as recited in claim 1, wherein the second structure-borne noise sensor is acoustically coupled to an inside panel of the automobile.

5. The device as recited in claim 1, wherein the first structure-borne noise sensor is situated at an inside of the automobile, at an inside of an automobile window or at an inside of an exterior paneling component of the automobile.

6. The device as recited in claim 1, wherein the second structure-borne noise sensor is situated in a spatial vicinity of the first structure-borne noise sensor.

7. A device for detecting sound in surroundings of an automobile, the device comprising: a first structure-borne noise sensor which is acoustically coupled to a first oscillating body at an outside of the automobile and provides a first audio signal; a second audio signal which represents further sound from an interior of the automobile; and a processing unit configured to subtract at least the second audio signal from the first audio signal,
   wherein the device includes a further noise sensor, which is configured to detect sound from an interior of the automobile and to provide the second audio signal,
   wherein the further noise sensor is a second structure-borne noise sensor, which is acoustically coupled to a second oscillating body at an inside of the automobile,
   wherein the processing unit is configured to subtract a third audio signal which is provided by an active sound source in the automobile or an interior microphone, from the first audio signal.

* * * * *